United States Patent
Boon

(10) Patent No.: US 6,198,087 B1
(45) Date of Patent: Mar. 6, 2001

(54) CMOS IMAGER WITH LIGHT SHIELD

(75) Inventor: Cathy L. Boon, Orange, CA (US)

(73) Assignee: Iteris, Inc., Anaheim, CA (US)

( * ) Notice: Subject to any disclaimer, the term of this patent is extended or adjusted under 35 U.S.C. 154(b) by 0 days.

(21) Appl. No.: 09/304,218

(22) Filed: May 3, 1999

(51) Int. Cl.[7] .................................................. H01L 27/14
(52) U.S. Cl. ....................... 250/208.1; 348/294; 297/443; 250/214.1
(58) Field of Search .............................. 250/208.1, 214 R, 250/214.1; 358/474, 482, 483, 493–497; 348/294, 297, 298, 302–304; 257/291, 292, 443, 444

(56) References Cited

U.S. PATENT DOCUMENTS

| | | | |
|---|---|---|---|
| 4,354,104 | * 10/1982 | Chikamura et al. | 250/214.1 |
| 4,369,372 | * 1/1983 | Yoshioka et al. | 250/214.1 |
| 4,583,002 | * 4/1986 | Knondo et al. | 250/208.1 |
| 5,841,126 | * 11/1998 | Fossum et al. | 348/294 |

* cited by examiner

*Primary Examiner*—Stephone B. Allen
(74) *Attorney, Agent, or Firm*—Myers, Dawes & Andras LLP

(57) ABSTRACT

Improved imaging system includes a CMOS imaging chip with a light blocking layer configured so as to block incident light from a portion of the readout circuitry sensitive to light. The light blocking layer may be positioned on top of a glass package housing the imaging chip or may be incorporated in the manufacture of the chip itself. Distortions in image data due to lighting conditions in outdoor applications are avoided by the presence of the light blocking layer resulting in improved image quality under such conditions.

20 Claims, 1 Drawing Sheet

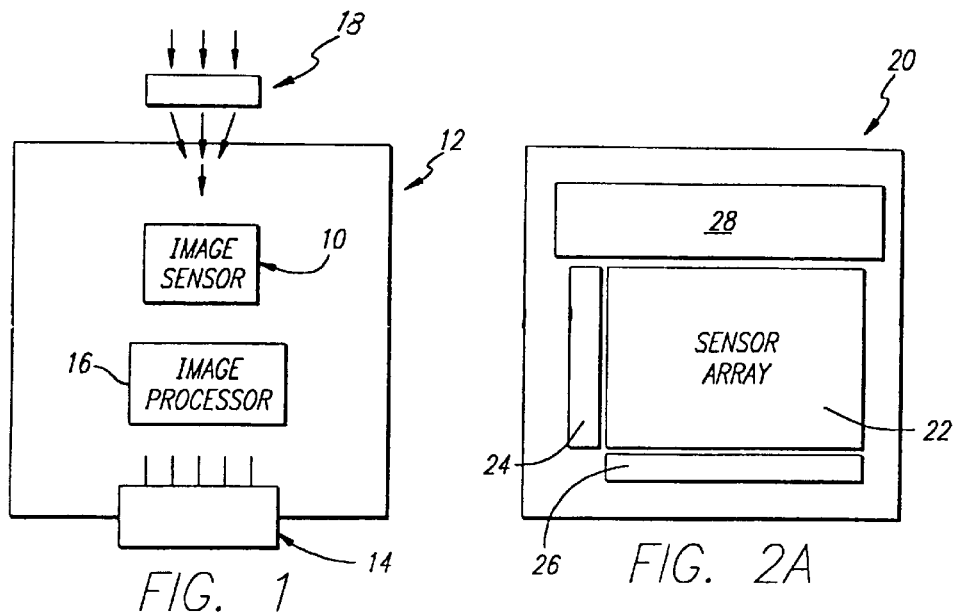
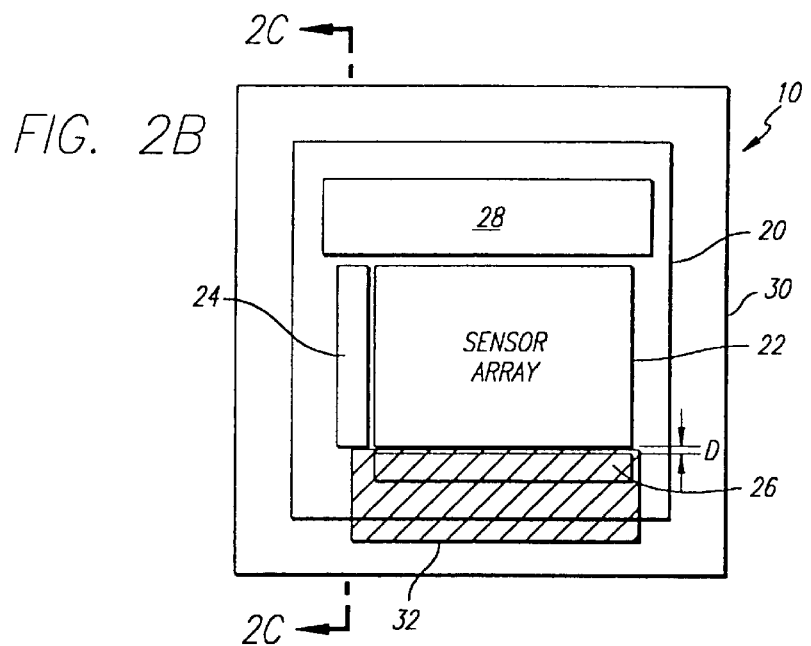
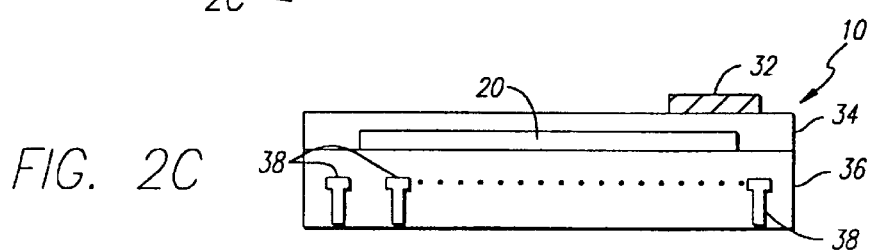

CMOS IMAGER WITH LIGHT SHIELD

BACKGROUND OF THE INVENTION

1. Field of the Invention

The present invention relates to image sensing systems. More particularly, the present invention relates to CMOS image sensing systems.

2. Description of the Prior Art and Related Information

Imaging systems are being incorporated into a variety of new products and employed in new applications due in large part to cost reductions associated with improved CMOS (Complimentary Metal Oxide Semiconductor) imaging technology as well as the increased availability of low cost processing power to process the resulting image data. For example, automotive applications employing such CMOS imaging systems have been recently introduced. One such automotive application is a lane tracking and lane departure warning system which images the roadway to detect when the vehicle deviates from a lane and issues a lane departure warning. Other automotive as well as other outdoor imaging system applications have been proposed. Such applications have the potential to expose the imaging system to bright sunlight at a variety of different angles and intensities. Also, automobile applications may be exposed to bright headlights shining directly into the imaging system.

In such outdoor applications, and in particular in an automobile lane tracking application using commercially available CMOS image sensors a distorted image output has been experienced under certain lighting conditions. In particular, an undesirable vertical striping effect has been experienced in the CMOS image sensor output under various combinations of daylight brightness and angle of the sun relative to the image sensor. Such distortions of the image output make it more difficult for the associated image processing system, for example a lane tracking system, to identify the relevant portion of the image and perform the image processing function. This in turn can impact on the reliability of the system which is very significant in many applications including the above-noted lane tracking applications.

Accordingly, the increased use of CMOS imaging systems in outdoor environments has created a need for an improved imaging system which is not susceptible to image distortion due to certain outdoor ambient lighting conditions. There is a further need for such an improved imaging system which is not associated with significantly increased costs or difficulty in manufacturing and assembly.

SUMMARY OF THE INVENTION

The present invention provides an improved CMOS imaging system which is not subject to distortions in image output in outdoor lighting environments. Furthermore, the present invention provides an improved CMOS imaging system which may be provided without substantial increase in cost over conventional CMOS imaging systems.

In particular, the present invention provides an imager sensor comprising an array of CMOS sensing elements corresponding to a plurality of image pixels and a read out circuit configured adjacent the array of sensing elements, at least a portion of the read out circuit including light sensitive circuitry. A light blocking layer is configured over at least the light sensitive portion of the read out circuit but not over the array of sensing elements. The light blocking layer may be provided on top of the glass top package containing the image sensor chip or may be provided as part of the chip manufacturing process. To accommodate typical dimensions and layouts of CMOS imaging chips, the light blocking layer is preferably spaced apart from the light sensing element by 0.006 inches or less.

The present invention exploits the observation that the distortions in output images experienced by conventional CMOS imaging systems under certain outdoor lighting conditions are caused by light sensitive circuitry associated with the readout and amplification of the output of the sensing elements (pixels) of the imager. Such light sensitive circuit elements will cause distortion in the output when bright light present in certain outdoor applications reaches these elements. The present invention shields these circuits without blocking the light sensing elements of the sensor itself. This is achieved by precise alignment of masking material over the light sensitive circuitry but spaced apart from the imaging elements themselves. This thus provides an inexpensive solution to the above-noted problem associated with conventional CMOS imaging systems.

Further features and advantages of the present invention will be appreciated by review of the following detailed description of the invention.

BRIEF DESCRIPTION OF THE DRAWINGS

FIG. 1 is a top schematic drawing of an imaging system in accordance with the present invention.

FIG. 2A is a top schematic drawing of a CMOS imaging chip employed in the imaging system of FIG. 1, illustrating the functional blocks of the chip.

FIG. 2B is a top schematic drawing of the imaging chip of FIG. 2A mounted in a integrated circuit package.

FIG. 2C is a side sectional view of the imaging chip and package shown in FIG. 2B.

DETAILED DESCRIPTION OF THE INVENTION

Referring to FIG. 1, the improved imaging system of the present invention is illustrated incorporating an imaging chip 10 which is resistant to light related distortions in image output.

The imaging chip 10 is shown configured in an imaging system which includes the optics 18 and printed wire board (PWB) 12, which includes image processing hardware 16 and an interface 14 for mounting the system in an appropriate housing for the particular application. The optics and PWB may be mounted in a suitable housing, not shown. For example, a suitable housing and mounting assembly is described in U.S. patent application Ser. No. 09/038,666, filed Feb. 27, 1998, the disclosure of which is incorporated herein by reference. The application described in the above-noted application is a automobile mounted vehicle assembly with a particular preferred application for a lane tracking system. Such an application is also one preferred application of the improved imaging system of the present invention as such application may encounter lighting conditions which produce the undesirable image distortion in conventional CMOS imaging chips. It will be appreciated, however, that further applications for the imaging system of the present invention are also possible and generally include any application where light intensities and angles can cause distortions in the output of the imaging chip.

Referring to FIGS. 2A, 2B and 2C, the light shielded image sensor 10 of the present invention is illustrated. The light sensing and readout circuitry of the sensor 10 is preferably implemented as a single integrated circuit (IC) or chip 20. In FIG. 2A, the chip 20 is illustrated in a block schematic diagram which illustrates the basic functional components which correspond to a conventional CMOS image sensor. In particular, the image sensing chip 20 includes a central array 22 of image sensing elements for the image pixels with associated row and column address and readout circuitry 24, 26, respectively. Typically, associated with the column readout circuitry 26 are CMOS amplifiers which amplify the signals from each column before being routed off chip for further processing. These amplifiers may be incorporated in the readout circuitry 26 as illustrated in FIG. 2A or may be a separate but closely adjacent circuitry block in other architectures. Additional circuitry which may vary with the particular imaging chip design is provided in circuitry block 28 and may typically include digital control logic for the chip. There are various manufacturers of CMOS imagers of the general architecture illustrated in FIG. 2A; one specific manufacturer is VLSI Vision Limited of Edinburgh, Scotland. A specific example of a CMOS imager which has the general illustrated architecture, which is suitable for a variety of outdoor applications and which is subject to the distortion problem described previously, is the VLSI Vision Limited W 5430 series of CMOS sensors. The detailed disclosure of such image sensor is described in the W 5430 functional specification which is publicly available, for example, at the VLSI Vision Limited's website at: http://vvl.co.uk, the disclosure of which technical specification is incorporated herein by reference.

The above noted image distortion problem associated with CMOS image sensors, and in particular with the above noted W 5430 CMOS image sensor has been identified by applicant as associated with the CMOS amplifiers configured in the column readout circuitry block 26 illustrated in FIG. 2A. Due to the constraints of the architecture these column readout amplifiers are necessarily positioned closely adjacent to the array of imaging elements 22 therefore any solution to the sensitivity problem associated with these amplifiers cannot in any way interfere with the proper functioning of the sensing array 22.

Referring to FIG. 2B, a top view of the image sensor 10 of the present invention is illustrated showing the imaging chip 20 mounted in a glass top package 30 and also showing the same functional circuitry blocks shown in FIG. 2A. A layer of light blocking material 32 is configured over the light sensitive circuitry 26, i.e., the circuitry incorporating the column amplifiers and column readout circuits. As may be seen the light blocking layer 32 is spaced a distance D from the array of sensing elements 22, where D must be less than the distance between the array 22 and the light sensitive circuitry block 26. Depending upon the particular architecture of the imaging chip, this distance D will typically be constrained to be less than or equal to about 0.006 of an inch. Light blocking layer 32 may be a thin opaque layer, such as a commercially available label, adhesively or otherwise bonded to the top surface of package 30 or may be composed of other suitable opaque materials. Such materials include a variety of paints, polishes, adhesive tapes and labels. One suitable adhesive label is a static dissipative label such as the XB-1129 label commercially available from Brady, USA, Inc. The light blocking layer 32 may be positioned manually using suitable magnification for precise registration relative to the circuitry blocks or may be positioned using automated equipment with the desired degree of registration preciseness to maintain the separation D within the desired range.

Referring to FIG. 2C a side view of the image sensor 10 in accordance with the present invention is illustrated showing the thin light blocking layer 32 configured on top of the glass lid 34 of the package 30. (Note that the dimensions are not to scale in the drawings, e.g., layer 32 is much thinner than shown.) Also shown in FIG. 2C is the underlying package body 36 which may be a conventional ceramic or plastic IC package. Package body 36 will also include a number of pinouts 38 although in FIG. 2C all of the pinouts are not shown for convenience of illustration and since individual pinouts will vary with the particular chip implementation.

Although the light blocking layer is illustrated in the above figures as a separate layer configured on top of a glass cover of an integrated circuit package, it will be appreciated that a variety of other approaches to blocking light to the light sensitive read out circuitry are possible while remaining within the scope of the present invention. For example, the layer 32 may be deposited as a film through spraying or other known thin or thick film deposition processes using a mask for precise alignment, either before or after the glass lid 34 is placed on top of the body 36. Alternatively, the light blocking layer 32 may be placed directly on top of the integrated circuit chip 20 itself, however, in this approach the particular material and deposition technique used must be chosen to not detrimentally affect the functionality of the circuit below the deposited layer. Finally, the light blocking layer 32 may be incorporated in the integrated circuit by the chip manufacturer as a separate layer deposited in accordance with integrated circuit manufacturing techniques, i.e., employing conventional masking and deposition steps. Accordingly, it will be appreciated that a variety of techniques are possible to provide the light blocking layer 32 while providing the benefits of the present invention.

Testing of the improved image sensors in accordance with the present invention has shown that the presence of the light blocking layer 32 prevents the undesirable distortions in the image when in the presence of the extreme outdoor lighting conditions which cause problems in conventional imaging chips. Accordingly, it will be appreciated that the present invention provides a simple but highly effective solution to the above noted problem. Minimal additional costs are associated with the manufacture of the improved imaging system of the present invention. Furthermore, it will be appreciated by those skilled in the art that the above description is of a presently preferred embodiment, that a variety of modifications may be made, while remaining within the scope of the present invention.

What is claimed is:

1. An imager sensor, comprising:
   an array of light sensing elements corresponding to a plurality of image pixels;
   a read out circuit configured adjacent the array of sensing elements, at least a portion of the read out circuit including light sensitive circuitry; and
   a light blocking layer configured over at least the light sensitive portion of the read out circuit but not over the array of sensing elements.

2. An imager sensor as set out in claim 1, wherein said light blocking layer is adjacent to one edge of said array of sensing elements.

3. An imager sensor as set out in claim 1, wherein said read out circuitry includes CMOS devices.

4. An imager sensor as set out in claim 1, wherein said light sensitive portion of the read out circuit comprises read out signal amplification circuitry.

5. An imager sensor as set out in claim 3, wherein said light sensing elements comprise CMOS sensing elements.

6. An imager sensor as set out in claim 1, wherein said array of sensing elements and said read out circuit are configured in an integrated circuit.

7. An imager sensor as set out in claim 6, wherein said image sensor further comprises a package, including a base and a transparent cover, wherein said integrated circuit is mounted in said base and wherein said light blocking layer is configured on said transparent cover.

8. An imager sensor as set out in claim 1, wherein said light blocking layer is spaced apart from said array of sensing elements by a distance of about 0.006 inch or less.

9. An image sensor as set out in claim 7, wherein said light blocking layer is adhesively bonded to said transparent cover.

10. An imaging system comprising:

an optical system for focusing incident light;

an image sensor configured to receive the focused incident light, including:
   an array of light sensing elements corresponding to a plurality of image pixels;
   a read out circuit configured adjacent the array of sensing elements, at least a portion of the read out circuit including light sensitive circuitry; and
   a light blocking layer configured over at least the light sensitive portion of the read out circuit; and an image processor for processing the image data provided from said image sensor.

11. An imaging system as set out in claim 10, wherein said light blocking layer does not cover any portion of said array of sensing elements.

12. An imaging system as set out in claim 10, wherein said readout circuitry includes CMOS devices.

13. An imaging system as set out in claim 10, wherein said light sensitive portion of the read out circuit comprises read out signal amplification circuitry.

14. An imaging system as set out in claim 10, wherein said light sensing elements comprise CMOS sensing elements.

15. An imaging system as set out in claim 10, wherein said array of light sensing elements and said read out circuit are configured in an integrated circuit.

16. An imaging system as set out in claim 10, wherein said image sensor further comprises a package including a base and a transparent cover, and wherein said integrated circuit is mounted in said base and wherein said light blocking layer is configured on said transparent cover.

17. An imaging system as set out in claim 10, wherein said light blocking layer is spaced apart from said array of sensing elements by a distance of about 0.006 inch or less.

18. An imaging system as set out in claim 10, wherein said light blocking layer is adhesively mounted to said transparent cover.

19. A method for preventing image distortion in the image output of a CMOS image sensor having light sensitive read out circuitry, comprising:

providing a CMOS image sensor in an integrated circuit, said image sensor including an array of light sensing elements and a CMOS read out circuit including light sensitive circuitry; and providing a light blocking layer over said light sensitive circuitry but not over said array of light sensing elements.

20. A method as set out in claim 19, wherein said step of providing a light blocking layer comprises positioning said layer within about 0.006 inches from said array of light sensing elements.

* * * * *